United States Patent [19]

Hoshino et al.

[11] Patent Number: 4,703,563
[45] Date of Patent: Nov. 3, 1987

[54] LASER MEASURING DEVICE

[75] Inventors: Shigeru Hoshino, Tokyo; Teruo Sato, Saitama, both of Japan

[73] Assignee: Nippon Power Engineering Co., Ltd., Tokyo, Japan

[21] Appl. No.: 831,303

[22] Filed: Feb. 20, 1986

[30] Foreign Application Priority Data

Feb. 20, 1985 [JP] Japan .................................. 60-31904

[51] Int. Cl.$^4$ ....................... G01C 11/00; G01B 11/26
[52] U.S. Cl. ........................................ 33/227; 33/138; 33/DIG. 21; 33/288
[58] Field of Search ................. 33/138, DIG. 21, 288, 33/286, , 299, 287; 356/248, 18

[56] References Cited

U.S. PATENT DOCUMENTS 3,803,720 4/1974 Helava ............................ 356/18 X
4,294,016 10/1981 Wickerson ....................... 33/138 X
4,513,508 4/1985 Jarman ................................. 33/288
4,535,699 8/1985 Buhler .............................. 33/287 X Primary Examiner—Harry N. Haroian
Attorney, Agent, or Firm—Fleit, Jacobson, Cohn & Price

[57] ABSTRACT

A laser measuring device which comprises a horizontal rail, a vertical pole slidable on the horizontal rail, a laser source mounted on the vertical pole for sliding movement in the longitudinal direction of the vertical pole, a ferromagnetic web provided on each of the horizontal rail and the vertical pole and extending in the longitudinal direction of the horizontal rail or the vertical pole, respectively, a self-retractable tape measure provided on each of the horizontal rail and the vertical pole and extractable in the longitudinal direction, a paramagnetic member attached to the leading end of each tape measure; and an engaging member provided on the leading end of each tape measure and engageable with the base portion of the vertical pole or the mounting base of the laser source.

4 Claims, 6 Drawing Figures

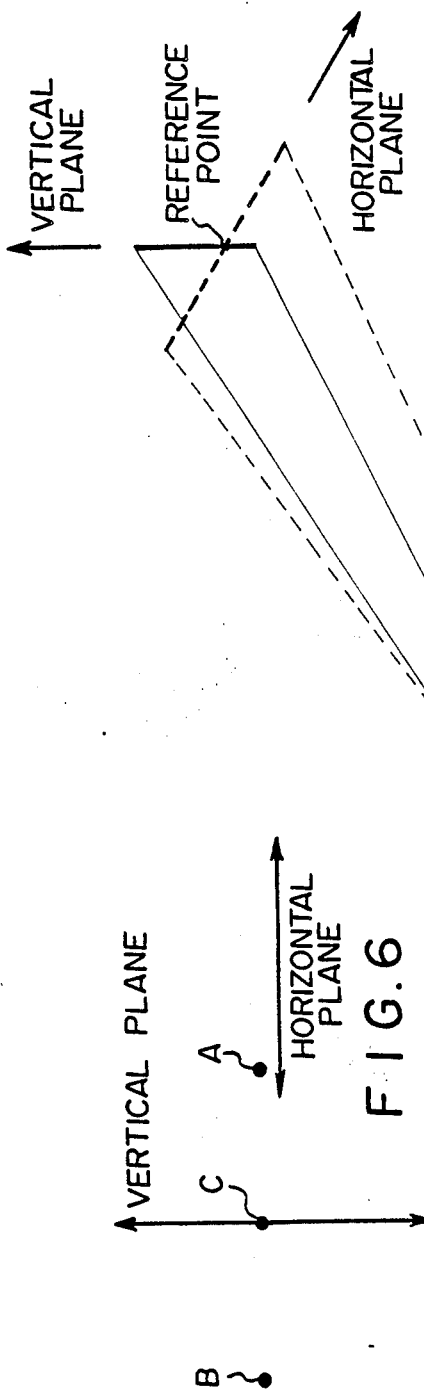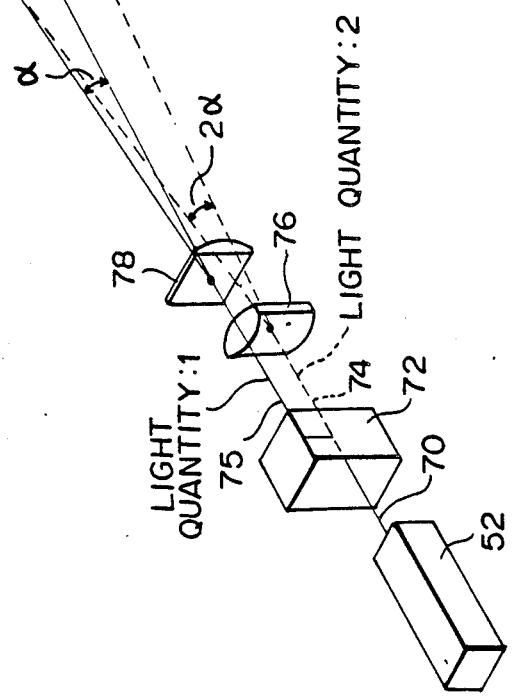
FIG. 5
FIG. 6

LASER MEASURING DEVICE

BACKGROUND OF THE INVENTION

1. Field of the Invention

The present invention relates to a laser measuring device and, more particularly, to a laser measuring device which is adapted to emit a laser beam in a predetermined direction from a fixed position so that the laser beam is used as a reference in locating a measuring object or in measuring the position of the measuring object. The laser measuring device of the invention is suitable for use in measurement of automotive bodies or in setting up of an architectural structure.

A known laser measuring device for automotive bodies has orthogonal rails arranged ahead of the automotive body and on one side of the same. A laser beam splitter is provided at the crossing of these rails. A laser beam is split by the laser splitter into two beams which run in parallel with respective rails. Each laser beam running in parallel with the rail is deflected at a right angle by a penta prism which is adapted to slide on each rail and is directed towards the automotive body. In this known laser measuring device, a scale is fixed on the rail so that the position of the penta prism can be read on the scale.

The known device just described suffers from a disadvantage in that it cannot conduct three-dimensional measurement because the laser beam runs only within planes, i.e., two dimensionally. In order to overcome this problem, it has been proposed to use a scale plate which is suspended vertically from the measuring point, such that the measurement in the vertical direction is conducted by applying a laser beam to the scale. This not only complicates the measurement but also restricts the measurable range because the suspension of the scale plate is impeded by various parts or members which are below the measuring point.

Another drawback of the conventional measuring method comes about because the laser beam is always emitted horizontally. For this reason the laser beam is inconveniently interrupted by parts or members and cannot reach the measuring point thus resulting in a measuring failure. This is particularly a problem when the measuring point is hidden deep in, for example, the engine room of an automobile. When measuring the distance between two points, the distance is determined through computation which is conducted on the basis of the values read on the scale which is fixed to the rail. In addition, a complicated computation is required for the determination of the position of the central point between these two points.

OBJECT OF THE INVENTION

It is therefore an object of the present invention to provide a laser measuring device which can easily accomplish measurement of the coordinate values of a position, as well as distance value, in a vertical plane, by means of a laser beam, particularly a laser measuring device which permits an easy detection and setting of the middle point between two measuring points by virtue of easy displacement of the zero point of the scale.

Another object of the invention is to provide a laser measuring device which can direct a laser beam in various directions other than the horizontal direction, thereby enabling measurement of a point which is hidden deep in a compartment of a structure.

SUMMARY OF THE INVENTION

According to the present invention, the above and other objects can be accomplished by a laser measuring device comprising: a horizontal rail which is laid horizontally; a vertical pole slidable on the horizontal rail in horizontal direction; a laser source mounted on the vertical pole for sliding movement in the longitudinal direction of the vertical pole; a ferromagnetic web member provided on each of the horizontal rail and the vertical pole and extending in the longitudinal direction of the horizontal rail or the vertical pole, respectively; a self-retractable tape measure provided on each of the horizontal rail and the vertical pole and extractable in the longitudinal direction; a paramagnetic member attached to the leading end of each tape measure; and an engaging member provided on the leading end of each tape measure and engageable with the base portion of the vertical pole or the mounting base portion of the laser oscillating portion.

According to a specific aspect of the present invention, there is provided a laser measuring device in which the laser source is rockable within a vertical plane.

In one aspect of the present invention, the laser source is adapted to oscillate a laser beam which diverges in cross-like form.

In one aspect of the present invention, the laser beam oscillated by the laser source has a greater diverging angle in the horizontal plane than in the vertical plane.

In one aspect of the present invention, the ferromagnetic web member is constituted by the horizontal rail which is made of a ferromagnetic material.

According to another aspect of the present invention, the ferromagnetic web member is constituted by the vertical pole which is made of a ferromagnetic material.

BRIEF DESCRIPTION OF THE DRAWINGS

FIG. 5 is a schematic diagram for explaining how a vertical reference line is created; and FIG. 6 is a schematic diagram used in explaining how the middle vertical plane is set.

DESCRIPTION OF THE PREFERRED EMBODIMENTS

Figure 1:
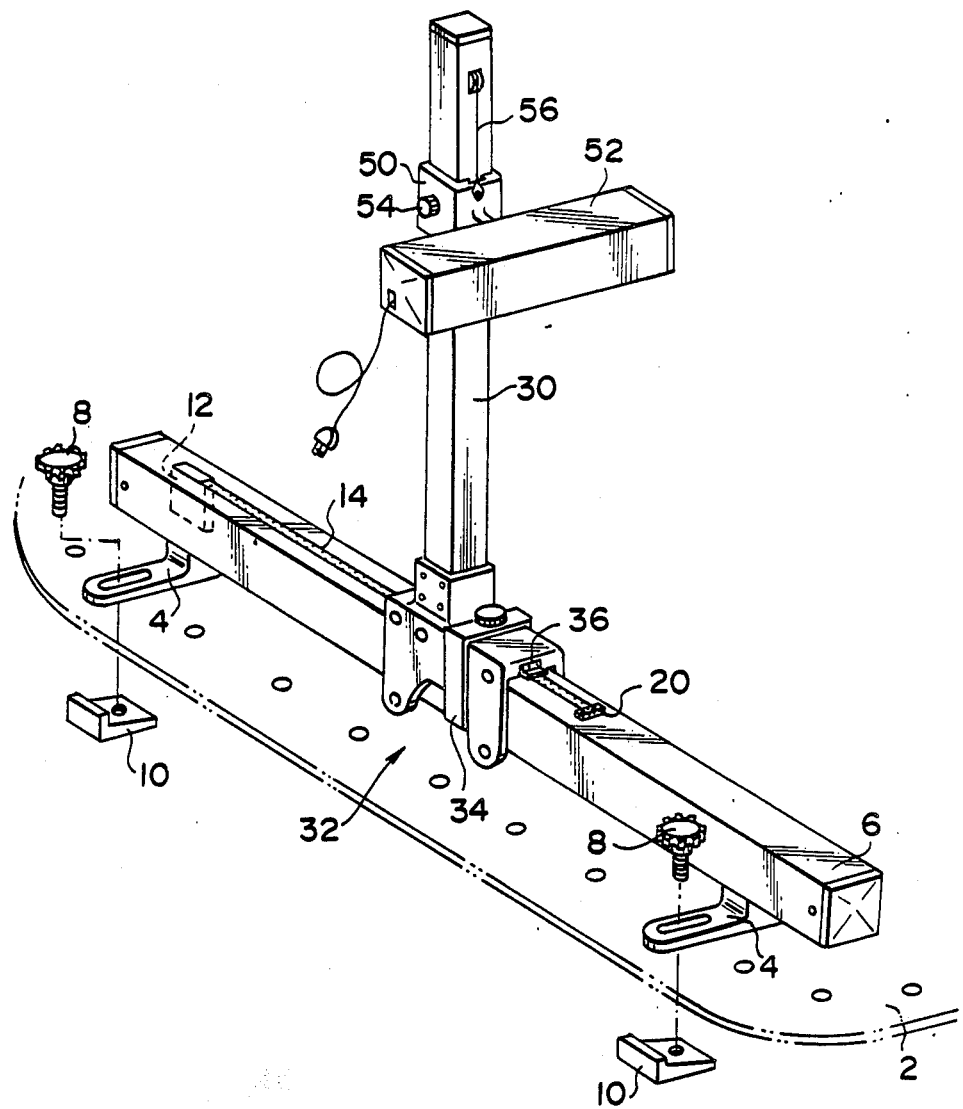
FIG. 1 is a perspective view of a laser measuring device embodying the present invention.
Figure 2:
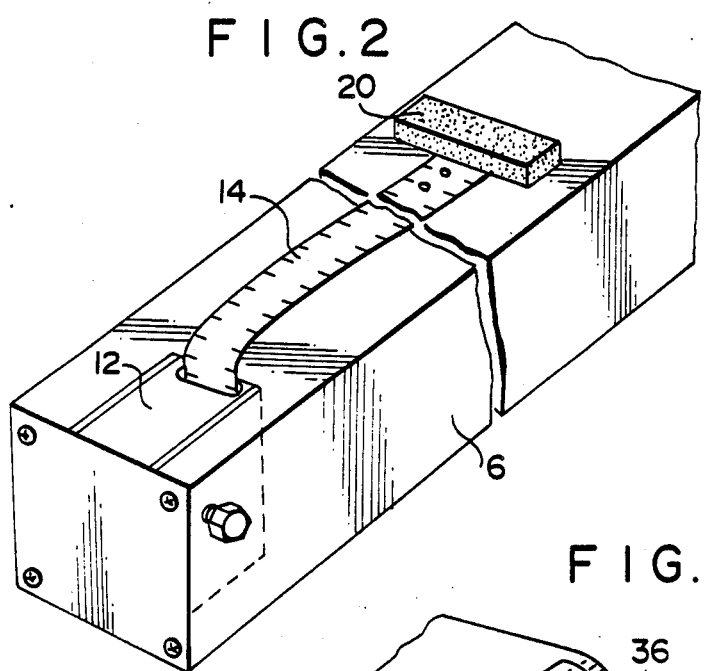
FIG. 2 is an enlarged perspective view of a portion of the measuring device shown in FIG. 1, showing particularly an end of a horizontal rail where a self-retracting tape measure is provided.
Figure 3:
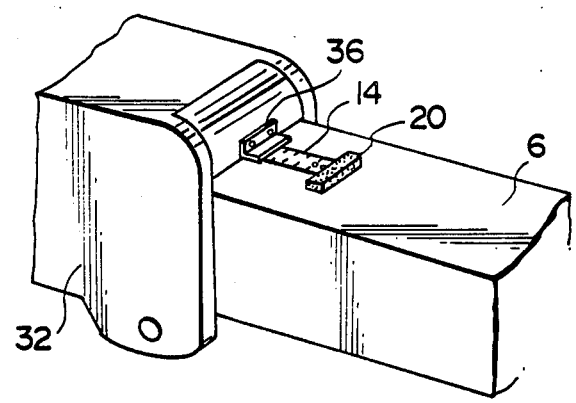
FIG. 3 is an enlarged perspective view of a portion of the laser measuring device shown in FIG. 1, showing particularly a reading portion of a scale belt.

Referring to FIG. 1, a laser measuring device in accordance with the invention has a horizontal rail 6 which is fixed to the upper side of a table 2 through legs 4 in such a manner as to extend horizontally. The legs 4 are fixed to the table 2 by a suitable fastener such as bolts 8 and nuts 10. As will be seen from FIG. 2, a self-retractable tape measure 12 is embedded in one end of horizontal rail 6. The tape measure 12 has a scale belt 14 having a length long enough to cover the entire length of the horizontal rail 6 when the belt is stretched.

The horizontal rail 6 is made of iron which is ferromagnetic. A paramagnetic member 20 is fixed to the end of the scale belt 14. The paramagnetic member produces, when it is affixed to the horizontal rail 6, a magnetic attracting force which is large enough to resist the self-retracting force of the scale belt 14 so as to maintain its position on the horizontal rail. The magnetic attracting force produced by the paramagnetic member 20, however, is so small that the paramagnetic member 20 can easily be moved by a sliding base 32 of a later mentioned vertical pole 30 or manually by an operator's hand.

The vertical pole 30 mentioned above is slidably mounted on the horizontal rail 6. The sliding base 32 of the vertical pole 30 has a clamp device 34 as will be seen from FIG. 1. The sliding base 32 also is provided with an index member 36 which is adapted to contact the paramagnetic member 20 so as to move the same away from the reel of the tape measure 12. The index member 36 also serves as an index for reading the position on the scale belt 14.

Figure 4:
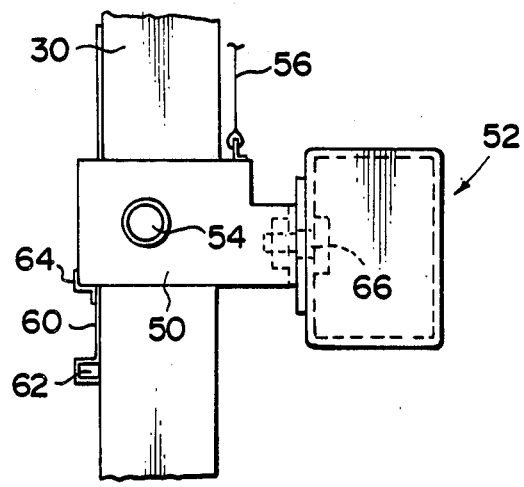
FIG. 4 is a side elevational view of a laser oscillating portion.

A laser source 52 has a sliding base 50 which is slidably carried by the vertical post 30. The sliding base 50 is provided with a fixing member 54 and retains one end of a wire 56 the other end of which suspends a weight balancer (not shown) within the vertical pole 30. As in the case of the horizontal rail 6, the vertical pole 30 has a self-retractable tape measure (not shown) embedded in the upper end portion thereof. A paramagnetic member 62 is attached to the end of the scale belt 60. As will be seen from FIG. 4, an index member 64 which is equivalent in construction and function to the aforementioned index member 36, is provided on the sliding base 50.

With reference to FIGS. 1 and 5, the laser source 52 is rotatably supported by the sliding base 50 through a shaft 66, so that it can oscillate a laser beam within a vertical plane. The laser beam 70 emitted from the laser source 52 is split by a beam splitter 72 into two beams 74, 75 at a light ratio of 2:1. The split beam of the greater light quantity is diffused in a horizontal plane by means of a cylindrical lens 76, so as to be used in setting of a horizontal reference line, whereas the split beam of the smaller light quantity is diffused within a vertical plane through a semi-cylindrical 78 lens by an angle ($\alpha$) which is half the angle of diffusion ($2\alpha$) in the horizontal plane, so as to be used in the setting of the vertical reference line.

The setting of a reference point, a reference line or a reference plane is conducted in a series of steps: namely, suitably sliding the vertical pole 30 on the horizontal rail 6 and suitably sliding the laser source 52 along the vertical pole 30, suitably swinging the laser source 52; and fixing these slidable and swingable parts at suitable positions by means of the clamp device 34 and the fixing screw 54. With reference to FIGS. 1 and 6, the setting of the middle vertical plane including the middle point C between two specific points A, B is conducted in the following manner. The point B is assumed to be closer to the self-retractable tape measure 12 than the point A. At the first step, the vertical pole 30 and the laser source 52 thereon are moved and swung on the horizontal rail 6 and the vertical pole 30 so as to aim the laser beam at the point A, thereby the scale belt 14 is stretched.

Subsequently, the vertical pole 30 and the laser source 52 are moved and swung again so as to aim the laser beam at the point B. While, the scale belt 14 is left at the Position to aim the laser beam at the point A, since the paramagnetic member 20 is fixed to the horizontal rail 6. Thus, the displacement of the vertical pole 30, namely horizontal distance between the points A and B can easily be known by reading out the position on the scale belt 14 pointed by the index member 36 when the laser beam is aimed at the point B. The middle point is calculated so as to halve the horizontal distance AB. The vertical pole 30 is moved so as to make the index member 36 point the scale of the scale belt 14 corresponding to the middle point, thereby the middle vertical plane is obtained by swinging the laser beam.

As has been described, in the laser measuring device of the invention, the scale belt of the tape measure is stretched to and fixed at a predetermined reference position following up the movement of the laser oscillating portion in one direction and, thereafter, the laser oscillating portion moves independently of the scale belt. This permits an easy measurement of the distance between a predetermined reference position and any desired measuring point, as well as determination of the middle point between these two points. In addition, since the laser oscillating portion is swingable within a vertical plane, it is possible to measure a point which is hidden deep in a recess or compartment.

The invention has thus been shown and described with reference to a specific embodiment, however, it should be noted that the invention is in no way limited to the details of the illustrated structure but changes and modifications may be made without departing from the scope of the appended claims.

What is claimed is:

1. A laser measuring device comprising a horizontal rail, a verticle pole slidable along the horizontal rail, a laser source mounted on the vertical pole for sliding movement therealong, self-retractable tape measures provided on respective ferromagnetic surfaces of each of the horizontal rail and vertical pole, the tape measures being extendable in the longitudinal direction of the respective rail and pole, a paramagnetic engaging member attached to the leading end of each tape measure, the vertical pole and the laser source having base portions mounted on the rail and pole respectively over the respective tape measures so as to engage the respective engaging members and extend the respective tape measures when the pole and laser source base portions are moved in respective directions along the rail and pole, the engaging members retaining the tape measures in extended position by magnetic attraction to the respective ferromagnetic surfaces when the pole and laser source base portions are moved in reverse directions.

2. A laser measuring device according to claim 1, wherein said laser source is rockable within a vertical plane.

3. A laser measuring device according to claim 1, wherein said laser source is adapted to oscillate a laser beam which diverges in cross-like form.

4. A laser measuring device according to claim 3, wherein said laser beam oscillated by said laser source has a greater diverging angle in the horizontal plane than in the vertical plane.

* * * * *